United States Patent Office 3,654,171
Patented Apr. 4, 1972

3,654,171
WATER AND METAL OXIDES OR HYDROXIDES AS DISPERSANTS FOR CLAY-THICKENED GREASES
Robert E. Emond, Mooretown, Ontario, and Alcide C. Horth, Sarnia, Ontario, Canada, assignors to Esso Research and Engineering Company
No Drawing. Filed June 4, 1969, Ser. No. 830,519
Int. Cl. C10m 5/26
U.S. Cl. 252—30                                       13 Claims

ABSTRACT OF THE DISCLOSURE

Clay-thickened greases which are water resistant, shear stable, and noncorrosive to copper are prepared by combining a major amount of lubricating oil, 3 to 20 wt. percent of an oleophilic clay grease thickener and a dispersing agent comprising 1.0 to 12 wt. percent of a Group I, II, III, IV, VII, or VIII metal oxide or hydroxide and 1 to 15 wt. percent of water, said water including free water and/or water of hydration. The water can subsequently be left in the grease or can be later removed or reduced by dehydration.

BACKGROUND OF THE INVENTION

Field of the invention

This invention relates to clay-thickened greases, which are water resistant, shear stable and noncorrosive to copper, and the process for preparing aid greases. More specifically, this invention relates to a clay-thickened grease, formed by mixing a major amount of lubricating oil, 3 to 20 wt. percent of an oleophilic clay grease thickener and, as dispersing agents, 1.0 to 12 wt. percent of a Group I, II, III, IV, VII or VIII metal oxide or hydroxide and 1 to 15 wt. percent water, said water including free water and/or water of hydration, to disperse said clay in said oil, and then milling said mixture. If said water is felt to be above the level desired for the finished grease, said milling can be carried out at elevated temperatures to drive off excess water or dehydration can be carried out before or after said milling step.

Description of the prior art

The use of clays as lubricating oil thickeners in grease composition is well known to the art. Various patents describe in detail the type of clays used as oil thickeners and methods of manufacture of such clays. These patents include U.S. 2,626,241 and British Pat. 875,732.

Dispersants such as propylene carbonate and acetone have been used in the past in the manufacturing process of clay-thickened greases. For example, British Pat. 875,732 discloses the use of propylene carbonate as a dispersant in Example 1 and J. L. McAtee, Jr., et al., on page 90 of the June 1968 N.L.G.I. Spokesman disclosed the use of acetone as a dispersant for clay greases. However, it has been found that greases made with propylene carbonate as a dispersant are shear unstable and have poor water resistance, and greases made with acetone have a tendency to be corrosive to copper and also have poor water resistance. Moreover, special manufacturing equipment (explosion-proof motors and very efficient exhaust systems) have to be employed when acetone is used as the dispersant.

SUMMARY OF THE INVENTION

It has now been found that excellent clay-thickened greases which are water resistant, shear stable and noncorrosive to copper can be formed by employing a combination of water and metal oxides or hydroxides as dispersants for clay-thickened greases. Said water, after acting in conjunction with said metal oxide or hydroxide to disperse said clay in said oil can subsequently be left in the grease or can be removed or reduced by hydration.

More specifically, it has been found that a grease having the desired characteristics mentioned above can be prepared by mixing a major amount of lubricating oil, 3 to 20 wt. percent of an oleophilic clay grease thickener, and a dispersing agent to disperse said clay in said oil comprising 1.0 to 12 wt. percent of a Group I, II, III, IV, VII or VIII metal oxide or hydroxide and 1 to 15 wt. percent of water, said water including free water and/or water of hydration, and then preferably milling said mixture. Under similar conditions, water alone, or oxides or hydroxides alone, in combination with clay and oil failed to form a grease-like gel and produced a product having ASTM worked penetrations at 77° F. after 60 strokes of 380 mm./10 and above.

The metal oxides and hydroxides which may be used in conjunction with water, as the dispersing agent for the clay-thickened greases of this invention, include those oxides and hydroxides of metal found in Groups I, II, III, IV, VII and VIII of the Periodic Table. (See Periodic Table of Elements, Perry's Chemical Engineering Handbook (McGraw-Hill, 1963).) Exemplary of this group are the compounds and families of compounds of calcium oxide, magnesium oxide, strontium oxide, e.g. SrO, SrO$_2$, barium oxide, e.g. BaO, BaO$_2$, BaO$_2 \cdot$8H$_2$O, titanium dioxide, titanium trioxide, zirconium dioxide, cuprous oxide, zinc oxide, aluminum oxide, e.g. Al$_2$O$_3$, $$Al_2O_3 \cdot 3H_2O$$

lead oxide, lead dioxide, nickel oxide, manganic oxide, manganese dioxide, iron oxide, sodium hydroxide, magnesium hydroxide, calcium hydroxide, strontium hydroxide, e.g. Sr(OH)$_2$, Sr(OH)$_2 \cdot$8H$_2$O, barium hydroxide, e.g. Ba(OH)$_2$, Ba(OH)$_2 \cdot$H$_2$O, Ba(OH)$_2 \cdot$5H$_2$O, $$Ba(OH)_2 \cdot 8H_2O$$

zinc hydroxide, cupric hydroxide, aluminum hydroxide, manganic hydroxide, manganous hydroxide, lithium hydroxide, e.g. LiOH, LiOH·H$_2$O and nickel hydroxide.

Preferred for use in this invention are calcium hydroxide and calcium oxide.

The oxides and hydroxides of this invention are employed in conjunction with water. About 1.0 to 12 wt. percent, preferably 1 to 5 wt. percent, of a member selected from this group of hydroxides and oxides will be used in combination with 1 to 15 wt. percent, preferably 1 to 10 wt. percent, of water based on the total weight of the grease composition.

The base lubricating oil may be mineral or synthetic and preferably is a mineral lubricating oil. Naphthenic lubricating oils are especially preferred as they appear to result in better structural stability of the grease. Other mineral lubricating oils which can be used include those derived from paraffinic, asphaltic or mixed base crudes.

Oleophilic clay grease thickeners which can be used in this invention are available commercially under trade names such as "Bentone 34" (dimethyl dioctadecyl ammonium bentonite), "Baragel" (a hectorite containing about 25 wt. percent magnesium oxide and 55 wt. percent silicon dioxide in the form of elongated lath shape particles coated with an ammonium compound), "Nykon 77" (an organic ammonium montmorillonite, to which has been added 30 wt. percent, based on the weight of the clay, of sodium nitrite as a rust inhibitor) etc. Alternately, untreated naturally occurring clays can be obtained and rendered oleophilic by methods known in the art.

The clays which can be rendered oleophilic and then used for thickening include bentonite, fuller's earth, attapulgite, etc. Bentonite materials, e.g., the montmorillonites, are most commonly used and a clay having less than 20% impurities is preferred. Two types of untreated bentonite clay (1–2 micron size) which are available are Hectorite and Wyoming clay. These products possess typical compositions as follows:

| Components | Wyoming clay | Hectorite clay |
|---|---|---|
| $SiO_2$ | 63 | 58–59 |
| $Al_2O_3$ | 21 | 0.2 |
| $MgO$ | 2 | 26–27 |
| Other | 14 | 14.8 |

These clays are usually rendered oleophilic so as to be compatible with lubricating oil by reacting the bentonite with a water dispersion of an aliphatic amine salt or quaternary ammonium salt which coats the surface of the clay particles with organic molecule chains. These salts are normally prepared by reacting an aliphatic amine with the desired acid, e.g. acetic or hydrochloric acid. The treated clay is then usually heated to remove all water. Various patents describe in detail these oleophilic clays and methods for the manufacture (see, e.g., British patent specifications 904,880; 703,249; 875,732; and 664,830 and U.S. Pats. 2,531,437 and 2,875,152.)

The ultimate dispersion of the clay in the oil generally relies on a combination of the dispersant used and the amount of mechanical work applied. Before the dry oleophilic clay is added to the oil, it is usually in the form of large aggregates with the organic chains parallel to the clay surfaces. Mechanical forces alone have a very difficult time in breaking these aggregates apart, thus the need for the dispersant. It is believed that while the dispersant does not directly interact with the oleophilic organic chain, it does interact with the clay surface in such a manner that the organic chains on the clay are made more mobile and the aggregates are more easily broken up, resulting in the formation of more individual particles. As a result, the effect of the water and metal oxide or hydroxide is to better disperse the clay component throughout the lubricating oil, thereby improving its gelling effect. Thus, since the primary function of this combination of water and metal hydroxide or oxide is to act as a dispersant which facilitates the gelling process, both water (either in free or combined form) and the metal oxides and hydroxides listed above should be present while the oil gels. Without the water, a combination of oil, clay and anhydrous metal oxides and hydroxides form an essentially liquid composition which is unsuitable as a grease, as does a combination of oil, clay and water without the metal oxide or hydroxide.

The greases of this invention can be prepared by mixing a major amount of lubricating oil and minor amounts of an oleophilic clay grease thickener and the dispersing agent of this invention and then milling said mixture in any suitable mill, e.g. in a roll mill, colloidal mill, Lancaster disperser, Manton-gaulin homogenizer, etc. The order of addition of the components is not critical and thus clay and a part of the oil could first be combined and then the dispersant added and then the rest of the oil added, or the dispersant and clay can first be combined and then added to the oil or the dispersant and oil can be first combined and then the clay added to it, etc. This latter order of addition, however, is preferred.

The aforesaid mixing is generally performed at a temperature ranging from ambient (e.g. 77° F.) to about 220° F., and is preferably carried out at a temperature in the range of about 150 to 200° F. for a period ranging from 1 to 60 minutes. The milling may be carried out at temperatures ranging from ambient (e.g. 77° F.) to about 400° F. When it is desirable to eliminate or reduce the final amount of water present in the grease, e.g., to a range of 0 to about 2 wt. percent, e.g., 0.01 to about 1.5 wt. percent of the final grease composition, then temperatures in the range of about 212° F. to about 400° F. can be used in the mill. Alternatively, dehydration can be carried out before or after said milling step.

Other lubricating additives can also be added in amounts of about 0.001 to 10 wt. percent each, based on the total weight of the final grease composition. These are generally mixed into the grease after it has been milled. Examples of such additives include rust preventatives such as sodium nitrite, calcium petroleum sulfonate and sorbitan monooleate; load carrying agents such as lead diamyl dithiocarbamate, molybdenum disulfide, graphite, tricresyl phosphate and free sebacic acid; oxidation inhibitors such as phenyl alpha naphthylamine; dyes; other grease thickeners; and the like.

DESCRIPTION OF THE PREFERRED EMBODIMENTS

The more detailed practices of the present invention are illustrated by the following examples, wherein parts are given by weight only, unless otherwise specified. These examples are illustrative only and are not intended to limit the invention in any way except as indicated by the appended claims.

EXAMPLE 1

5.5 grams of Baragel (a hectorite containing about 25% magnesium oxide and 55% silicon dioxide) were blended for a period of 5 minutes with 34.4 grams of a mineral lubricating oil having a viscosity at 210° F. of 50 SUS and a VI of 70 (hereinafter referred to as Oil A). 1.7 grams of calcium oxide (CaO) dispersed in about 2 grams of water were added to the mixture. Thickening took place within 2 minutes. The thickened oil was then diluted with 58.4 grams of a lubricating mineral oil having a viscosity at 210° F. of 70 SUS and a VI of 70 (hereinafter referred to as Oil B). The product was milled in a Paterson "Trihomo" type mill for 15 minutes a 220°–240° F. to produce a grease with an ASTM worked penetration at 77° F. after 60 strokes of 280 mm./10. It was not corrosive to copper and had excellent water resistance.

EXAMPLE 2

6.8 grams of Baragel, 1.3 grams of lead dioxide ($PbO_2$) dispersed in 2 grams of water, 34.1 grams of Oil A and 57.8 grams of Oil B were blended for a period of 5 minutes at a temperature of 150° F. The product was milled and gave a grease upon cooling with an ASTM worked penetration at 77° F. after 60 strokes of 272 mm./10 which was not corrosive to copper.

EXAMPLE 3

8.0 grams of Baragel, 3.5 grams of aluminum oxide ($Al_2O_3$) and 5 grams of water were added to 49 grams of a paraffin lubricating oil, having an SUS at 100° F. 4,000 derived from Western Canadian crude (hereinafter referred to as Oil C) and 39.5 grams of a mineral lubricating oil having an SUS at 100° F. of 1,400 (hereinafter referred to as Oil D) and were mixed for 10 minutes at a temperature of 180°. The product was milled and upon cooling gave a grease with a worked penetration at 77° F. after 60 strokes of 300 mm./10.

EXAMPLE 4

7.05 grams of Baragel, 1.75 grams of iron oxide ($Fe_2O_3$) dispersed in 5 grams of water, 49 grams of Oil C and 39 grams of Oil D were blended simultaneously in a Hobart mixer for a period of 5 minutes at 180° F. The product was milled and upon cooling gave a product a No. 1 NLGI consistency. The color of the product was red, and the product was stable to shear, i.e. it softened by only 10 mm./10 after working 10,000 strokes in an ASTM worker.

Comparative Examples A and B

The procedure of Examples 3 and 4 was repeated using Baragel, water and oil but omitting the addition of the metal oxides. The products showed no gelation of the oil after milling several times and their penetrations were greater than 400 ASTM units.

EXAMPLE 5

8.0 grams of Baragel, 2.5 grams of calcium oxide, 5 grams of and 87 grams of a light stock mineral lubricating oil were blended together for a period of 10 minutes at 130° F. The product was then milled for 15 minutes at a temperature of 230° F., cooled and further mixed with 1 gram of sodium nitrite (to impart rust protection) and 0.5 gram of phenyl alpha naphthylamine (for oxidation resistance). The product had an ASTM worked penetration of 314 mm./10 at 77° F. and 60 strokes. At 10,000 strokes the product had a penetration of 323 mm./10, and at 100,000 strokes the product had a penetration of 313 ASTM units. In the ASTM roller after 100 hours at room temperature, the penetration increased by only 44 points mm./10.

EXAMPLE 6

10 grams of Baragel and 3 grams of barium hydroxide octohydrate $(Ba(OH)_2 \cdot 8H_2O)$ (with no free water) were combined with 48 grams of Oil C and 39 grams of Oil D at about 180° F., for 5 minutes. The product was milled and cooled and formed a hard grease having an ASTM worked penetration of 246 mm./10 at 77° F. after 60 strokes.

EXAMPLE 7

8.0 grams of Baragel and 2 grams of calcium hydroxide in 5 grams of water were mixed with 45 grams of Oil C and 45 grams of Oil D at 180° for 5 minutes. The product was milled for 10 minutes at 300° F. to a final water content of .01 gram, cooled and 1 gram of $NaNO_2$ and .6 gram of phenyl alpha naphthylamine were then mixed into the cooled grease. The grease formed was compared to two commercially available clay greases, one of which uses propylene carbonate as a dispersant and the other uses acetone as a dispersant. The comparative results are shown in Table I.

Water resistance was evaluated by mixing 100 grams of grease and 200 grams of tap water for 2 hours at 150° F. in the ASTM roller. The adhesiveness of the wet grease was assessed visually. In this test commercial greases X and Y showed lack of adhesion for the roller and the cylinder. On the other hand, the product of Example 7 adhered very well under these same conditions.

Corrosiveness to copper was assessed by the Federal Standard Test No. 791A, Method 5309.3, in which a copper strip was held in the grease (half in, half out) for 24 hours at 210° F.

As can be seen from Table I, clay-thickened greases using the dispersants of this invention are superior in water resistance; shear stability and non-corrosiveness to copper over commercially available clay-thickened greases using other dispersants.

While particular embodiments of this invention are shown in the examples, it will be understood that the invention is obviously subject to the variations and modifications disclosed above without departing from its broader aspects; and, therefore, it is not intended that the invention be limited to the specific modifications which have been given above for the sake of illustration, but only by the appended claims.

What is claimed is:

1. A process for preparing a clay-thickened grease comprising the steps of: (a) combining a major amount of lubricating oil, 3 to 20 wt. percent of an oleophilic clay grease thickener and a dispersing agent to disperse said clay in said oil, comprising about 1.0 to about 12 wt. percent of a Group I, II, III, IV, VII, VIII metal oxide or hydroxide and about 1 to about 15 wt. percent of water, said water including water present as water of hydration; and (b) milling said mixture.

2. A process as recited in claim 1 wherein the oleophilic clay grease thickener is bentonite clay.

3. A process as recited in claim 2 wherein 6 to 9 wt. percent of said clay is dispersed with about 1 to about 10 wt. percent water and about 1 to about 5 wt. percent of said metal oxides or hydroxides.

4. A process as recited in claim 3 wherein said metal oxide or hydroxide is calcium oxide or hydroxide.

5. A process as recited in claim 1 wherein said water, after acting in conjunction with said metal oxide or hydroxide to disperse said clay in said oil is removed or reduced by dehydration.

6. A process as recited in claim 1 wherein step (b) is carried out at a temperature in the range of about 212° F. to about 400° F.

7. A clay-thickened grease composition comprising (a) a major amount of lubricating oil; (b) 3 to 20 wt. percent of an oleophilic clay grease thickener; and (c) 1.0 to 12 wt. percent of a Group I, II, III, IV, VII or VIII metal oxide or hydroxide wherein said grease has been made in the presence of about 1 to about 15 wt. percent of water, said water including water present as water of hydration and 1.0 to 12 wt. percent of said metal oxide or hydroxide.

8. A clay-thickened grease composition comprising (a) a major amount of lubricating oil; (b) 3 to 20 wt. percent of an oleophilic clay grease thickener; and (c) a dispersing agent comprising 1.0 to 12 wt. percent of a Group I, II, III, IV, VII or VIII metal oxide or hydroxide and 0.01 to 15 wt. percent of water, said water including water present as water of hydration wherein said composition has been made in the presence of about 1 to about 15% of water of water and 1.0 to 12 wt. percent of said metal oxide or hydroxide.

TABLE I

| Designation | Example 7 | Commercial grease X | Commercial grease Y |
|---|---|---|---|
| Thickener | 8% Baragel | 8% Baragel | Clay. |
| Dispersant | 2% lime | 0.7% propylene carbonate | Acetone. |
| Oil type | Oils C plus D | Mineral lubricating oil | Paraffin base bright stock. |
| Color | Dark brown | Brown | Brown. |
| Oil visc. SUS at 100° F | 2,600 | 550 | 2,600. |
| Rust inhibitor | 1% $NaNO_2$ | | |
| Anti-oxidant | 0.6% PAN | 1.0% PBN | |
| ASTM penetration, 60 strokes 77° F. mm./10 | 285 | 275 | 320. |
| ASTM dropping point, ° F | 650 | 500+ | 500+. |
| Oxidation: | | | |
| NH bomb, p.s.i. loss/100 hr. ASTM D 942 | 13 | 3 | 16.5. |
| High temp. spindle life in hrs. at 350° F | 248 | | 231. |
| Bearing rust test, ASTM D 1743 | #2 pass | Fail | #3 fail. |
| Water resistance: Adhesion ASTM roller—24 hrs. at 150° F., 100 g. grease; 200 ml. water | Excellent | Poor | Poor. |
| Shear stability: Δpen 100,000 strokes | +21 | +75 | +30. |
| Storage stability: Δpen (ASTM D 277) after 2 months | +12 | | +20. |
| Roller stability: ASTM D 1831, 100 hrs. at 150° F. Δpen | +100 | | +124. |
| Copper corrosion: ASTM D 130, 24 hr.s at 210° F | Pass | Pass | Fail. |

9. The composition of claim 8 wherein said dispersant comprises about 1 to about 5 wt. percent of said metal oxides or hydroxides and said water comprises about .01 to about 10 wt. percent of the total grease composition.

10. The composition of claim 8 wherein said oleophilic clay grease thickener is bentonite clay.

11. The composition of claim 8 wherein said metal oxide or hydroxide is calcium oxide or hydroxide.

12. The composition of claim 8 wherein said grease composition contains about 0.001 to 10 wt. percent of graphite.

13. A grease thickening composition comprises a Group I–IV, VII or VIII metal oxide or hydroxide, water, 0 to 10 wt. percent of lubricating oil, and an oleophilic clay grease thickener.

References Cited
UNITED STATES PATENTS

| | | | |
|---|---|---|---|
| 2,671,758 | 3/1954 | Vinograd et al. | 252—28 |
| 2,748,081 | 5/1956 | Peterson et al. | 252—28 |
| 2,831,809 | 4/1958 | Peterson | 252—28 |
| 2,879,229 | 3/1959 | Stratton | 252—28 |
| 3,349,034 | 10/1967 | Butcosk et al. | 252—28 |

DANIEL E. WYMAN, Primary Examiner

I. VAUGHN, Assistant Examiner

U.S. Cl. X.R.

252—28, 49.5